March 13, 1951 F. L. McINTYRE 2,545,100
GRAPE VINEYARD OR ORCHARD HOEING MACHINE
Filed Aug. 29, 1947 2 Sheets-Sheet 1

INVENTOR.
FRANK L. McINTYRE,
BY
McMorrow, Berman & Davidson
ATTORNEYS

March 13, 1951 F. L. McINTYRE 2,545,100
GRAPE VINEYARD OR ORCHARD HOEING MACHINE
Filed Aug. 29, 1947 2 Sheets—Sheet 2

INVENTOR.
FRANK L. McINTYRE,
BY
McMorrow, Berman + Davidson
ATTORNEYS

Patented Mar. 13, 1951

2,545,100

UNITED STATES PATENT OFFICE 2,545,100

GRAPE VINEYARD OR ORCHARD HOEING MACHINE

Frank L. McIntyre, Rochester, N. Y.

Application August 29, 1947, Serial No. 771,284

7 Claims. (Cl. 97—137)

This invention relates to cultivating machines and more particularly to a cultivating machine for use in grape vineyards or in orchards.

A main object of the invention is to provide a novel and improved cultivating machine adapted to cultivate between rows of grapevines in a vineyard or around fruit trees in an orchard, or for cultivating any other crop requiring special provision for avoiding injury to plant roots during the cultivating process.

A further object of the invention is to provide an improved cultivating apparatus adapted to be attached to a tractor or a similar mobile farm unit, said apparatus being simple in construction, easy to install and efficient in operation, and being readily controlled by the operator of the unit so that cutting of plant roots during the cultivating process may be avoided.

Further objects and advantages of the invention will become apparent from the following description and claims, and from the accompanying drawings, wherein:

Figure 1:
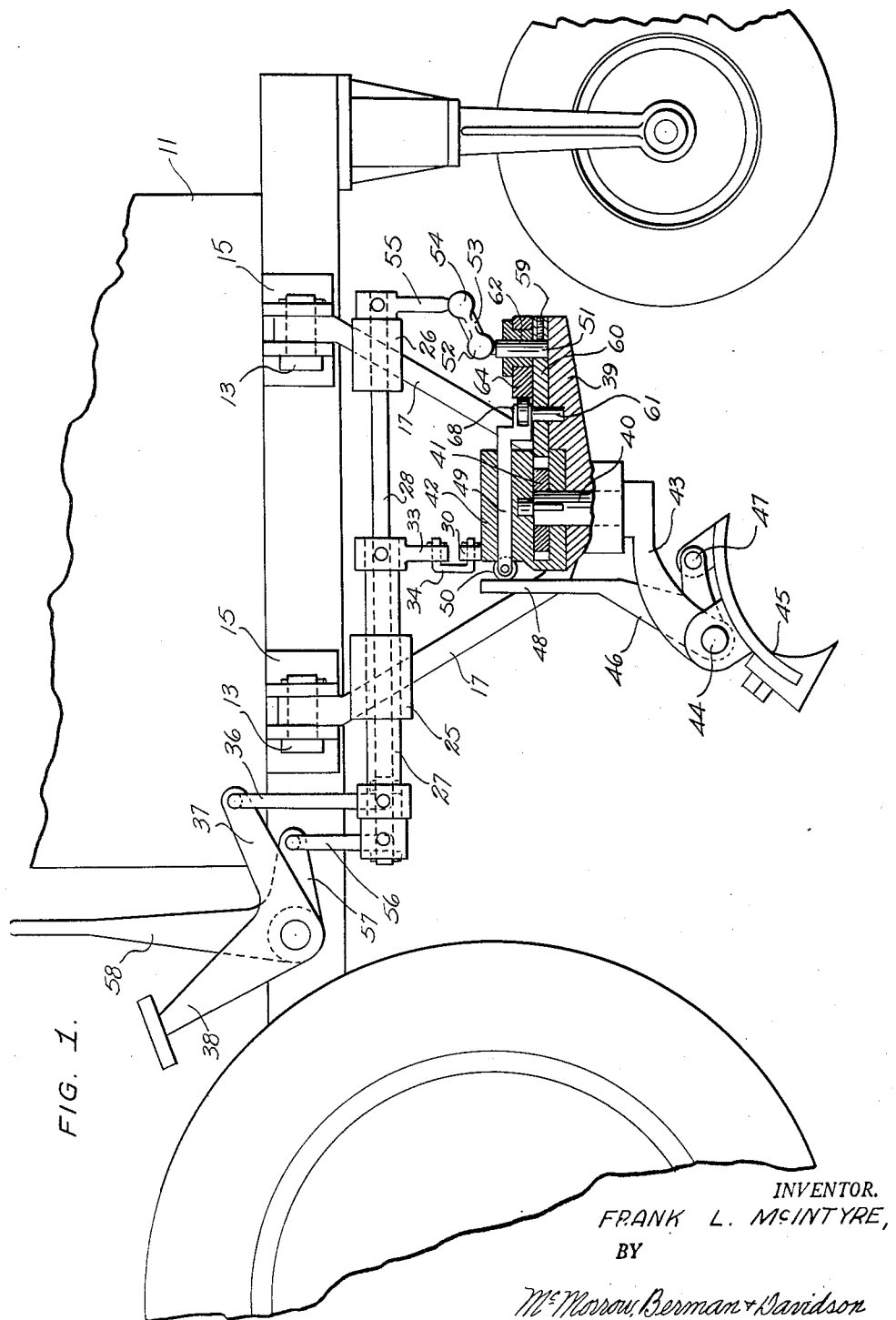
Figure 1 is a side elevational view, partly in cross-section, of a grape vineyard or orchard cultivating apparatus constructed in accordance with the present invention, said apparatus being shown mounted on a farm tractor.

Referring to the drawings, 11 designates the front end portion of a self-propelled farm vehicle, such as a tractor. Secured to the lower side portions of front end 11 by respective pairs of bolts 12, 12 and 13, 13 engaging in respective pairs of brackets 14, 14 and 15, 15 secured to the sides of the front end 11 are laterally inclined pairs of arms, shown respectively at 16, 16 and 17, 17 depending below front end 11 and carrying transversely extending horizontal support members 18, 18. Pivotally connected by a longitudinally extending pin 19 between support members 18, 18 is a transversely extending arm 20. Each support member 18 is formed adjacent its connection to pin 19 with a vertical upstanding lug 21 and with a vertical depending lug 22. Pivotally secured to opposing lugs 21, 21 is a top leaf spring 23 engaging the outer top surface portion of arm 20 and pivotally secured to opposing lugs 22, 22 is a bottom leaf spring 24 engaging the outer bottom surface of arm 20.

Secured to arms 17, 17 are longitudinally aligned sleeve bearings 25, 26. Journaled in bearing 25 is a sleeve 27 and journaled in said sleeve 27 and the sleeve bearing 26 is a longitudinally extending shaft 28.

Projecting inwardly from the end of top spring 23 is one arm 29 of a bent lever, the other arm thereof, shown at 30, projecting upwardly from the end of the spring. Projecting inwardly from the end of the bottom spring 24 is a lever arm 31. The ends of arms 29 and 31 are connected by a link 32. Depending from sleeve 27 is an arm 33 which is connected by a link 34 with the top end of arm 30. Projecting inwardly from the rearward portion of sleeve 27 is an arm 35. Arm 35 is connected by a link 36 to one arm 37 of a foot pedal lever 38 pivotally secured to the frame of the tractor adjacent the driver's seat. By depressing the foot pedal of lever 38, sleeve 27 is rotated counter-clockwise as viewed in Figure 2, causing lever arm 30 to be swung clockwise, whereby arm 29 and the link 32 acting together with arm 31 cause pivoted arm 20 to be rotated upwardly under the upward force exerted thereon by bottom spring 24.

The free end of arm 20 is formed with an enlarged horizontal support 39. Journaled in support 39 is a vertical shaft 40 to which is secured a gear 41, said gear being positioned in a U-shaped block 42 secured to support 39. Shaft 40 carries at its lower end a bracket 43 and pivotally secured to the end of bracket 43 by a horizontal pivot pin 44 is a hoe moldboard 45. Pivotally mounted on pivot pin 44 is a bent lever 46 having one arm thereof secured to the upper end of hoe member 45 at 47. The other arm 48 of bent lever 46 projects vertically upwardly adjacent block 42. Slidably mounted in block 42 is a bar 49 provided at one end with a roller 50 which abuts the vertical arm 48 of bent lever 46. Outward movement of bar 49 rotates said bent lever around the pivot pin 44 and causes hoe member 45 to be rotated toward a more steeply inclined position thereof from the position shown in Figure 1.

Spaced from block 42 and projecting vertically upwardly is a pin member 51.

Pin member 51 is rigidly secured, as by a set screw 59 to a gear sector 60 pivotally connected to support 39 by a pin 61, said pin 61 being at the center of the arc defined by the gear teeth of the sector. Said gear teeth are in meshing engagement with the teeth of gear 41. Rotatively carried on the upper portion of pin member 51 is a flanged bushing 62. The body portion of bushing 62 is rectangular in shape and is slidably received in a rectangular slot 63 formed in a cam member 64. Cam member 64 has a curved edge 65 adapted to engage a roller 68 carried at the inner end of bar 49. Cam member 64 also has an inwardly projecting arm 66 which is provided at its end portion with an upwardly projecting stud 67. Connected to the top end of stud 67 by a ball and socket connection 52 is a link 53. The other end of link 53 is connected by a ball and socket connection 54 to a depending arm 55 secured to the front end of shaft 28. Secured to the rear end of shaft 28 is an upwardly extending inclined arm 56 connected to one arm 57 of a bent hand lever 58 which is pivotally secured to the frame of the tractor adjacent foot pedal lever 38.

Figures 2, 3:
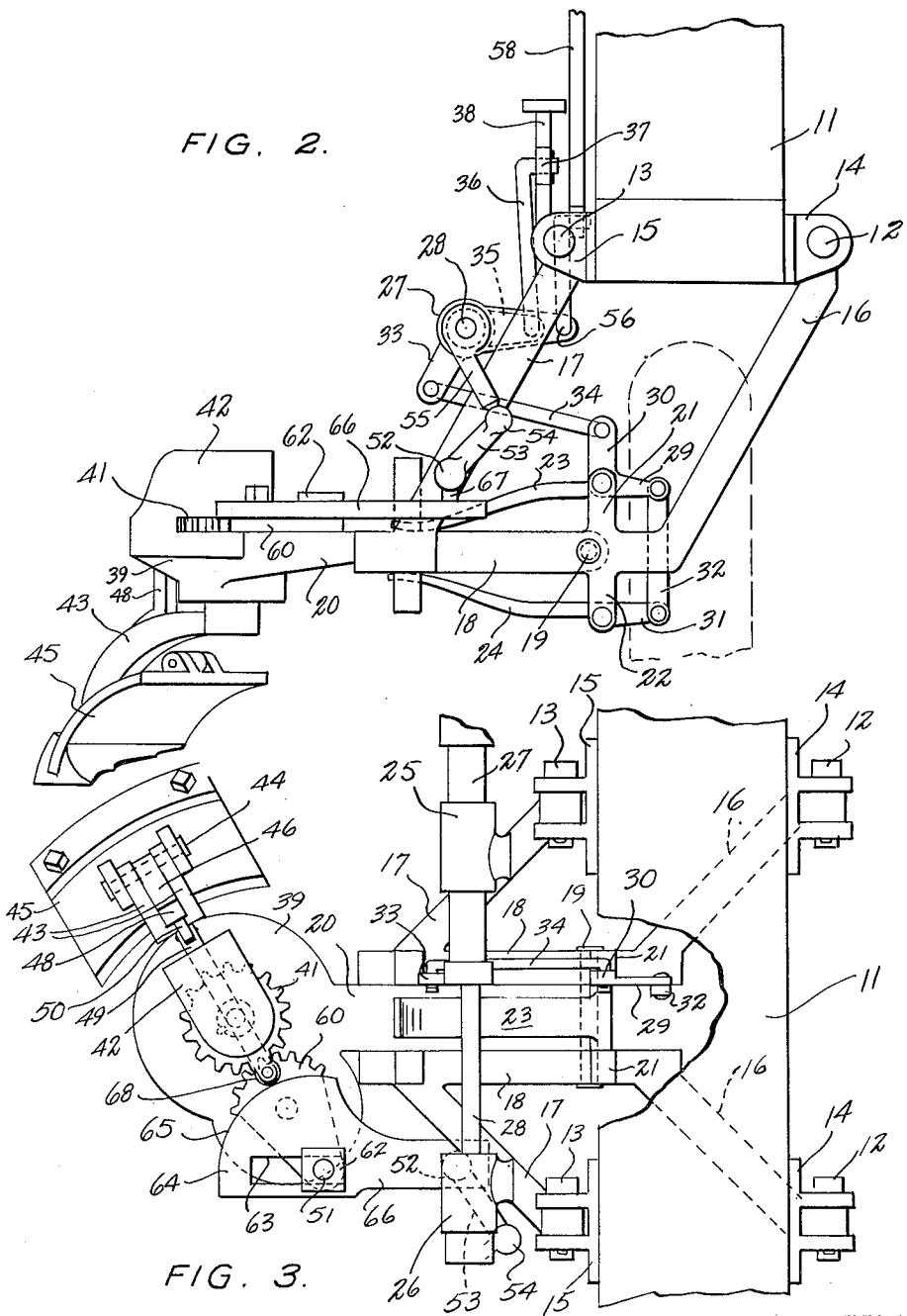
Figure 2 is a front elevational view of the cultivating apparatus shown in Figure 1.
Figure 3 is a top plan view, partly broken away, of the cultivating apparatus of Figure 1.

When hand lever 58 is pulled back by the operator, upward movement of arm 57 causes shaft 28 to rotate counter-clockwise, as viewed in Figure 2, and this motion is transmitted by link 53 to stud 67 to cause cam arm 66 to be rotated in a horizontal plane clockwise, as viewed in Figure 3. Pin 51 transmits a portion of the torque acting on cam arm 66 to gear sector 60, causing said gear sector to rotate counter-clockwise around pivot pin 61, thereby rotating gear 41 clockwise and causing the hoe member 45 to be swung from its normal laterally outwardly projecting position to a retracted position with respect to the tractor. At the same time, the cam edge surface 65 moves away from the inner bar roller 68, releasing the bar 49 and allowing the hoe 45 to assume an inclination of minimum steepness.

In operation of the apparatus, when normal hoeing is being performed, arm 20 is horizontally extended, bracket 43 is swung to an outwardly projecting position and cam edge surface 65 engages roller 68 so that the hoe 45 is held at a steep angle. When an area is reached having plant roots in the path of the hoe, the operator depresses foot pedal lever 38, causing the arm 20 to be elevated by spring 24, as above described, thereby lifting the hoe 45 so that it cannot deeply penetrate the soil, and the operator also pulls hand lever 58 back to thereby retract the hoe from its outwardly projecting position to an inwardly rotated position and at the same time releasing the hoe so that it may freely rotate to an angle of minimum steepness as it passes over the ground. In this manner the operator avoids damage to shallow plant roots during the process of cultivating a grape vineyard or an orchard.

While a specific embodiment of a cultivating apparatus for use in grape vineyards or orchards has been disclosed in the foregoing description, it will be understood that various modifications within the spirit of the invention may occur to those skilled in the art. Therefore, it is intended that no limitations be placed on the invention other than as defined by the scope of the appended claims.

What is claimed is:

1. A hoeing machine of the kind described comprising a supporting frame for attachment to a tractor, a laterally extending arm rockable on said frame, means carried by said frame for raising and lowering said arm, a mold board supporting bracket rotatably mounted on the outer end of said arm, a mold board rockable on said bracket, means for rotating said bracket on said arm, and means carried by said arm engaging said bracket and said mold board operable upon rotation of said bracket for changing the angle of inclination of said mold board relative to said arm.

2. A hoeing machine of the kind described comprising a supporting frame for attachment to a tractor, a laterally extending arm rockable on said frame, a mold board supporting bracket rotatably mounted on the outer end of said arm, a mold board rockable on said bracket, means for rotating said bracket on said arm, and cam means carried by said bracket engaging said mold board operable upon rotation of said bracket for changing the angle of inclination of said mold board relative to said arm.

3. A hoeing machine of the kind described comprising a supporting frame for attachment to a tractor, a laterally extending arm rockable on said frame, a mold board supporting bracket mounted on the outer end of said arm for horizontal rotation, means carried by said frame and engaging said bracket for selectively varying the rotated position of said bracket on said arm, a mold board rockably mounted on said bracket for vertical swinging movement for changing the angle of inclination relative to said arm, and cam means carried by said mold board and said bracket operative upon rotation of said bracket for changing the angle of inclination of the mold board.

4. A hoeing machine of the kind described comprising a supporting frame for attachment to a tractor, a laterally extending arm on said frame, a mold board supporting bracket rotatable on the outer end of said arm, means carried by said frame and engaging said bracket for selectively rotating said bracket, a mold board rockable on said bracket for swinging movement for changing the angle of inclination of said mold board relative to said arm, and cam means rotatable on said bracket engaging said mold board for rocking said mold board upon rotation of said bracket.

5. A hoeing machine of the kind described comprising a supporting frame for attachment to a tractor, a laterally extending arm on said frame, a mold board supporting bracket rotatable on the outer end of said arm, means carried by said frame and engaging said bracket for selectively rotating said bracket, a mold board rockable on said bracket for swinging movement for changing the angle of inclination of said mold board relative to said arm, a cam member on said arm, and a cam follower rotatable with said bracket operatively associated with said mold board for rocking said mold board upon rotation of said bracket.

6. A hoeing machine of the kind described comprising a supporting frame for attachment to a tractor, a laterally extending arm on said frame, a mold board supporting bracket rotatably mounted on the outer end of said arm, a gear fixed to said bracket, a gear segment pivotal on said arm engaging said gear for rotating said bracket, means for pivoting said gear segment, a mold board rockable on said bracket, a lever arm on said mold board, a cam member carried by said segment pivoting means, and a cam follower carried by said rotatable bracket engaging said cam and said lever arm for rocking said mold board upon rotation thereof with said bracket.

7. A hoeing machine of the kind described comprising a supporting frame for attachment to a tractor, a mold board supporting bracket rotatable on said frame, means carried by said frame and engaging said bracket for selectively rotating said bracket, a mold board rockable on said bracket for swinging movement for changing the angle of inclination of said mold board relative to said frame, and interengaging cam means carried by said bracket engaging said mold board for rocking said mold board upon rotation of said bracket.

FRANK L. McINTYRE.

REFERENCES CITED

The following references are of record in the file of this patent:

UNITED STATES PATENTS

| Number | Name | Date |
| --- | --- | --- |
| 2,185,634 | Jacobs et al. | Jan. 2, 1940 |
| 2,206,283 | Jacobs et al. | July 2, 1940 |
| 2,442,198 | Dawley | May 25, 1948 |